(12) United States Patent
Takano et al.

(10) Patent No.: US 12,138,990 B2
(45) Date of Patent: Nov. 12, 2024

(54) INPUT RECEPTION SYSTEM AND CONTROL METHOD OF INPUT RECEPTION SYSTEM

(71) Applicant: HONDA MOTOR CO., LTD., Tokyo (JP)

(72) Inventors: Hironori Takano, Tokyo (JP); Masayuki Shimada, Tokyo (JP); Hiroyuki Suginaka, Tokyo (JP); Shinji Yasuno, Tokyo (JP); Takashi Horiuchi, Tokyo (JP); Atsuro Kinbara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 358 days.

(21) Appl. No.: 17/679,569

(22) Filed: Feb. 24, 2022

(65) Prior Publication Data
US 2022/0297505 A1 Sep. 22, 2022

(30) Foreign Application Priority Data

Mar. 18, 2021 (JP) .................................. 2021-045147

(51) Int. Cl.
*B60H 1/00* (2006.01)
*G06F 3/04847* (2022.01)
(Continued)

(52) U.S. Cl.
CPC ..... *B60H 1/00985* (2013.01); *G06F 3/04847* (2013.01); *G06F 3/0488* (2013.01); *G06F 3/1423* (2013.01)

(58) Field of Classification Search
CPC .............. B60H 1/00985; B60H 1/0065; B60H 1/00807; B60H 1/0021; B60H 1/00271;
(Continued)

(56) References Cited

U.S. PATENT DOCUMENTS 6,009,355 A * 12/1999 Obradovich ............. B60Q 9/00
701/1
8,118,237 B2 * 2/2012 Vyas ................... B60H 1/00657
236/46 C
(Continued)

FOREIGN PATENT DOCUMENTS

JP 2003-312388 A 11/2003
WO WO-2016029044 A1 * 2/2016 ......... B60H 1/00064

*Primary Examiner* — Yonel Beaulieu
(74) *Attorney, Agent, or Firm* — WHDA, LLP

(57) ABSTRACT

A system comprising: first and second input reception devices; and a temperature detection unit for detecting a temperature inside a vehicle, wherein the first input reception device includes: a first input reception unit for receiving the input of the operation instruction by being pressed or touched, and including a first display unit for displaying information; and a control unit for controlling the operation of the operation target based on the received input of the operation instruction, a time required to start the second input reception device is longer than a time required to start the first input reception device, and the control unit causes the first display unit to display recommended operation information based on the detected temperature, and performs an operation corresponding to the recommended operation information in response to pressing or touching of the first display unit.

16 Claims, 9 Drawing Sheets

(51) Int. Cl.
  *G06F 3/0488* (2022.01)
  *G06F 3/14* (2006.01)

(58) Field of Classification Search
  CPC ........ B60H 1/00207; B60H 2001/2287; G06F
    3/04847; G06F 3/0488; G06F 3/1423;
    G06F 3/04842; G06F 3/0482; B60K
    35/28; B60K 2360/1438; B60K 2360/161;
    B60K 35/00; B60K 35/10; G09G
    2330/026; G09G 2354/00; G09G
    2380/10; G09G 3/20
  See application file for complete search history.

(56) References Cited

U.S. PATENT DOCUMENTS

| | | | | |
|---|---|---|---|---|
| 9,123,186 B2* | 9/2015 | Ricci | ..................... | H04L 67/306 |
| 11,724,564 B2* | 8/2023 | Rejkowski | ......... | B60H 1/00735 |
| | | | | 165/202 |
| 2010/0106363 A1* | 4/2010 | Mandujano | ........ | B60H 1/00657 |
| | | | | 701/36 |
| 2010/0206957 A1* | 8/2010 | Vyas | .................. | B60H 1/00428 |
| | | | | 165/61 |
| 2016/0280040 A1* | 9/2016 | Connell | ............. | B60H 1/00985 |
| 2016/0313019 A1* | 10/2016 | Mengle | .................... | F24F 11/64 |
| 2018/0079278 A1* | 3/2018 | Kirpichnikov | ..... | B60H 1/00742 |
| 2021/0078381 A1* | 3/2021 | Rejkowski | ......... | B60H 1/00978 |
| 2022/0299224 A1* | 9/2022 | VanBlon | .................. | F24F 11/30 |
| 2023/0077434 A1* | 3/2023 | Penilla | ................... | G08G 1/205 |
| | | | | 709/217 |
| 2023/0223154 A1* | 7/2023 | Stirling | .................. | G16H 50/80 |
| | | | | 340/602 |
| 2023/0278449 A1* | 9/2023 | Kinsey | ............... | B60H 1/00285 |
| | | | | 701/22 |
| 2024/0102867 A1* | 3/2024 | Yi | .......................... | G01K 3/005 |

* cited by examiner

INPUT RECEPTION SYSTEM AND CONTROL METHOD OF INPUT RECEPTION SYSTEM

CROSS-REFERENCE TO RELATED APPLICATION(S)

This application claims priority to and the benefit of Japanese Patent Application No. 2021-045147 filed on Mar. 18, 2021, the entire disclosure of which is incorporated herein by reference.

BACKGROUND OF THE INVENTION

Field of the Invention

The present invention relates to an input reception system and a control method of the input reception system.

Description of the Related Art

Japanese Patent Laid-Open No. 2003-312388 discloses a technique for operating an in-vehicle device (an air conditioner, a window opening and closing device, or the like).

However, in the technique described in Japanese Patent Laid-Open No. 2003-312388, for example, an operation instruction cannot be input until an engine of a vehicle is started and an input reception device (a display unit that displays a navigation screen) for receiving the operation instruction is started. In particular, in a case where the input reception device includes a display screen, it takes time to activate the display screen, and thus it is difficult to appropriately issue the operation instruction according to an in-vehicle environment until the display screen is activated (for example, it is difficult to issue an operation instruction for warming or cooling the inside of the vehicle when the inside of the vehicle is cold or hot).

The present invention has been made in response to the recognition of the above problem, and provides a technique for enabling a user to input an operation instruction according to an in-vehicle environment at an early stage after an engine is started.

SUMMARY OF THE INVENTION

According to one aspect of the present invention, there is provided an input reception system comprising: first and second input reception devices configured to receive an input of an operation instruction for operating an operation target of a vehicle; and a temperature detection unit configured to detect a temperature inside the vehicle, wherein the first input reception device includes: a first input reception unit configured to receive the input of the operation instruction by being pressed or touched, and including a first display unit configured to display information; and a first control unit configured to control the operation of the operation target based on the input of the operation instruction received via the first input reception unit, a time required to start the second input reception device is longer than a time required to start the first input reception device, and the first control unit causes the first display unit to display recommended operation information based on the temperature detected by the temperature detection unit, and performs an operation corresponding to the recommended operation information in response to pressing or touching of the first display unit.

DESCRIPTION OF THE EMBODIMENTS

Figure 1A:
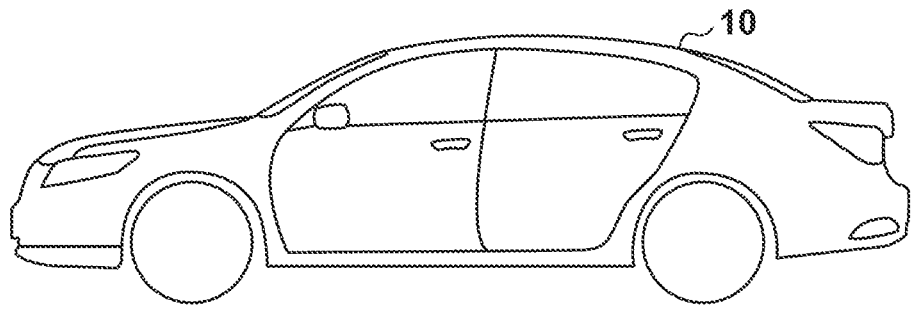
FIG. 1A is a view illustrating an example of an appearance of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Embodiment

Figure 1B:
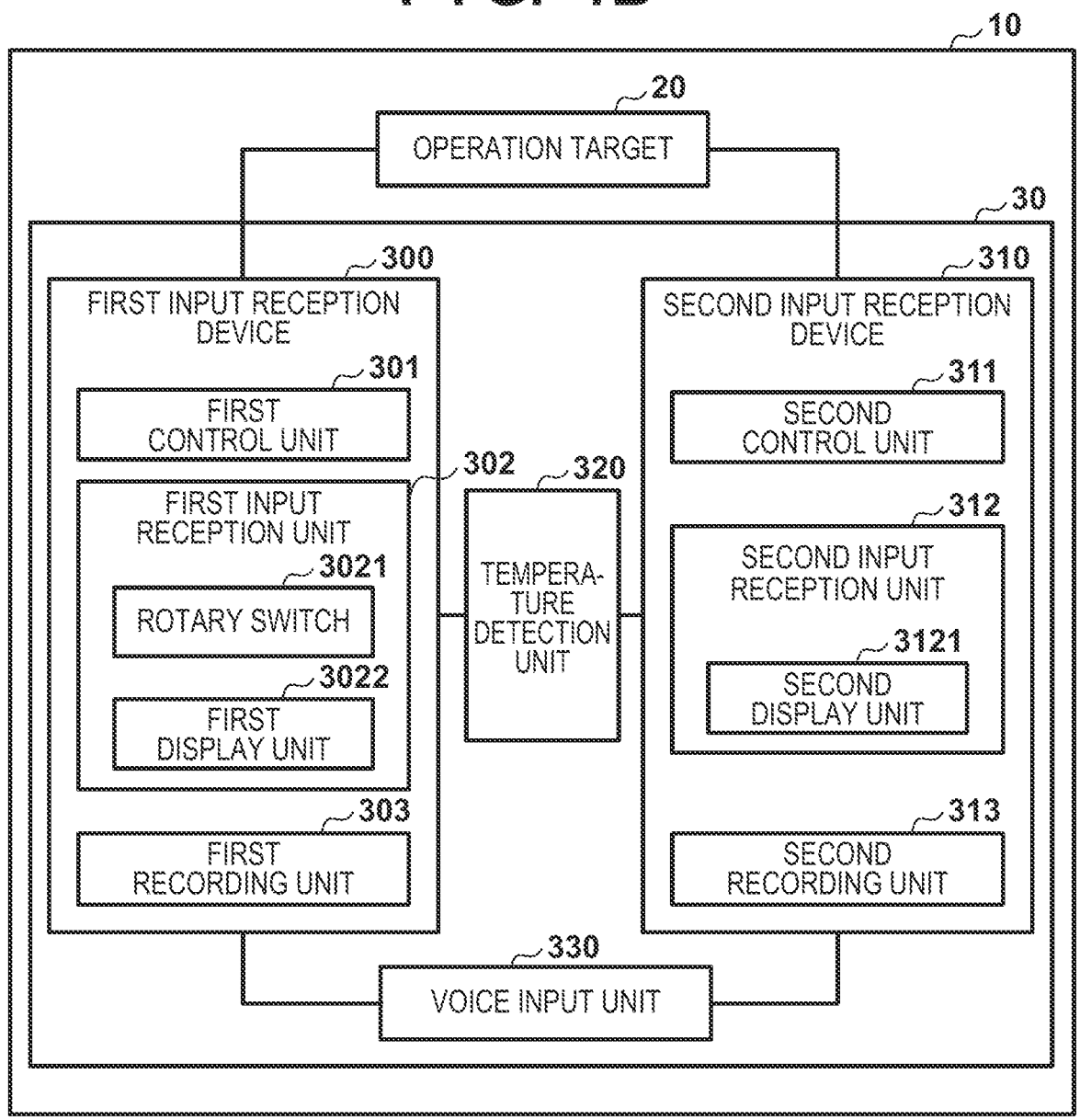
FIG. 1B is a diagram illustrating a configuration example of an input reception system included in the vehicle according to an embodiment of the present invention.

FIG. 1A is a view illustrating an example of a vehicle 10 according to an embodiment. FIG. 1B is a diagram illustrating an example of a configuration of an input reception system 30 of the vehicle 10 according to an embodiment.

The vehicle 10 includes one or more operation targets 20 and the input reception system 30 that receives an instruction for operating the operation target 20. The vehicle 10 also includes a configuration for controlling another operation (for example, traveling) of the vehicle 10, but such a configuration is not illustrated in the present embodiment.

The operation target 20 is, for example, an air conditioner, an openable and closable body such as a window or a sunroof of the vehicle 10, a reclining seat, a lighting device, an audio device, or the like.

The input reception system 30 receives an input of an operation instruction for operating the operation target 20.

The input reception system 30 includes a first input reception device 300, a second input reception device 310, a temperature detection unit 320 that detects a temperature inside the vehicle 10, and a voice input unit 330 that detects and inputs a voice uttered by a user inside the vehicle 10. The first input reception device 300 and the second input reception device 310 are started in response to start of an engine of the vehicle 10, but a time required to start the second input reception device 310 is longer than a time required to start the first input reception device 300.

<Configuration of First Input Reception Device>

The first input reception device 300 includes a first control unit 301, a first input reception unit 302, and a first recording unit 303.

The first control unit 301 is, for example, one or more CPUs, and implements each function of the first input reception device 300 by controlling the entire first input reception device 300 using a computer program or data stored in the first recording unit 303 that is one or more memories. Note that the first input reception device 300 may include one or more pieces of dedicated hardware different from the CPU, and at least a part of processing performed by the CPU may be performed by the dedicated hardware. Examples of the dedicated hardware include an application specific integrated circuit (ASIC) and a field programmable gate array (FPGA).

The first control unit 301 controls an operation of the operation target 20 corresponding to the operation instruction input via the first input reception unit 302. Furthermore, in a case where the operation instruction is recognized based on the voice input via the voice input unit 330, the first control unit 301 can also perform a control of operating the operation target according to the operation instruction.

Figure 2A:
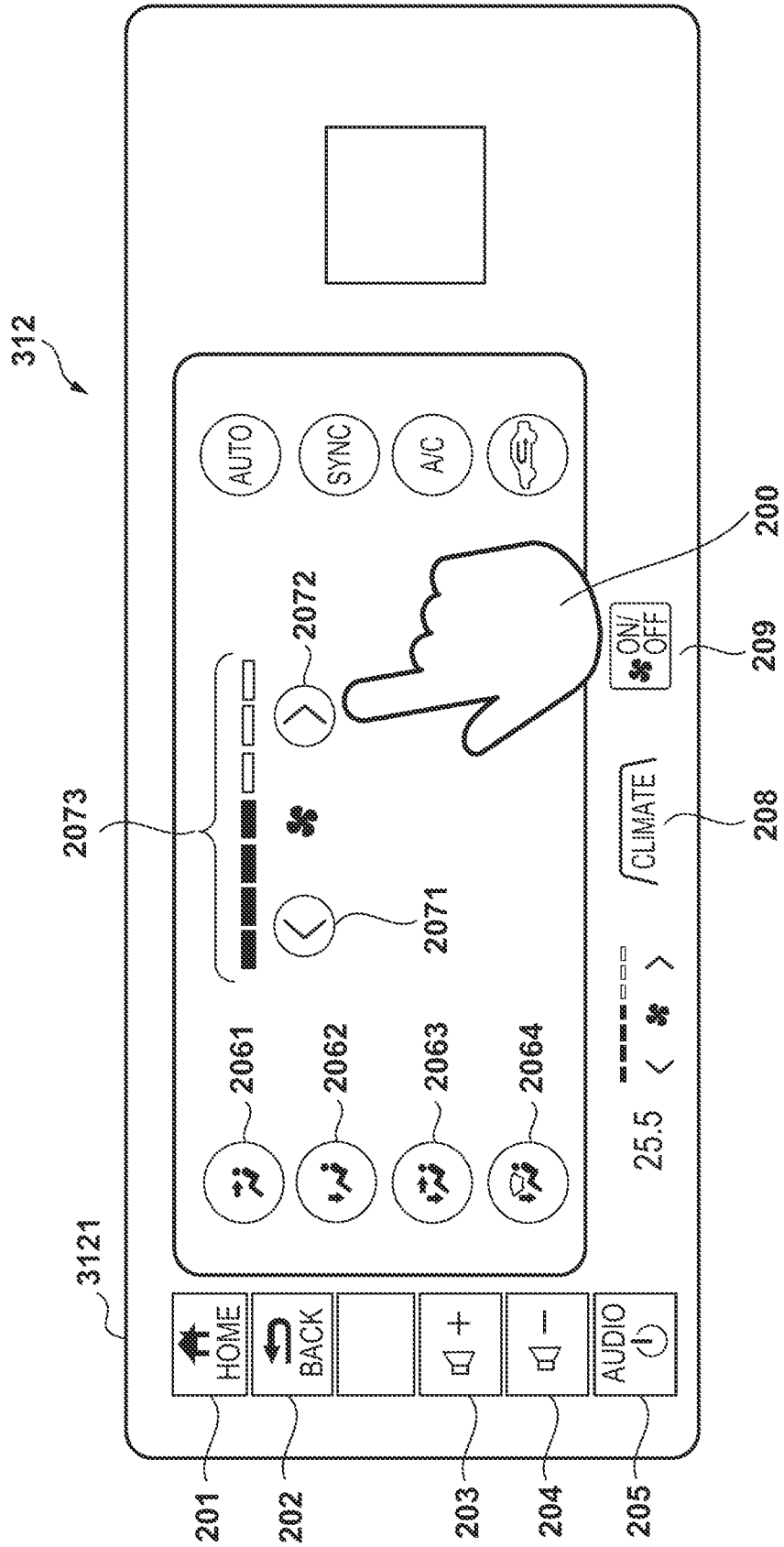
FIG. 2A is a view illustrating an example of an appearance of a second input reception unit according to an embodiment of the present invention.
Figure 2B:
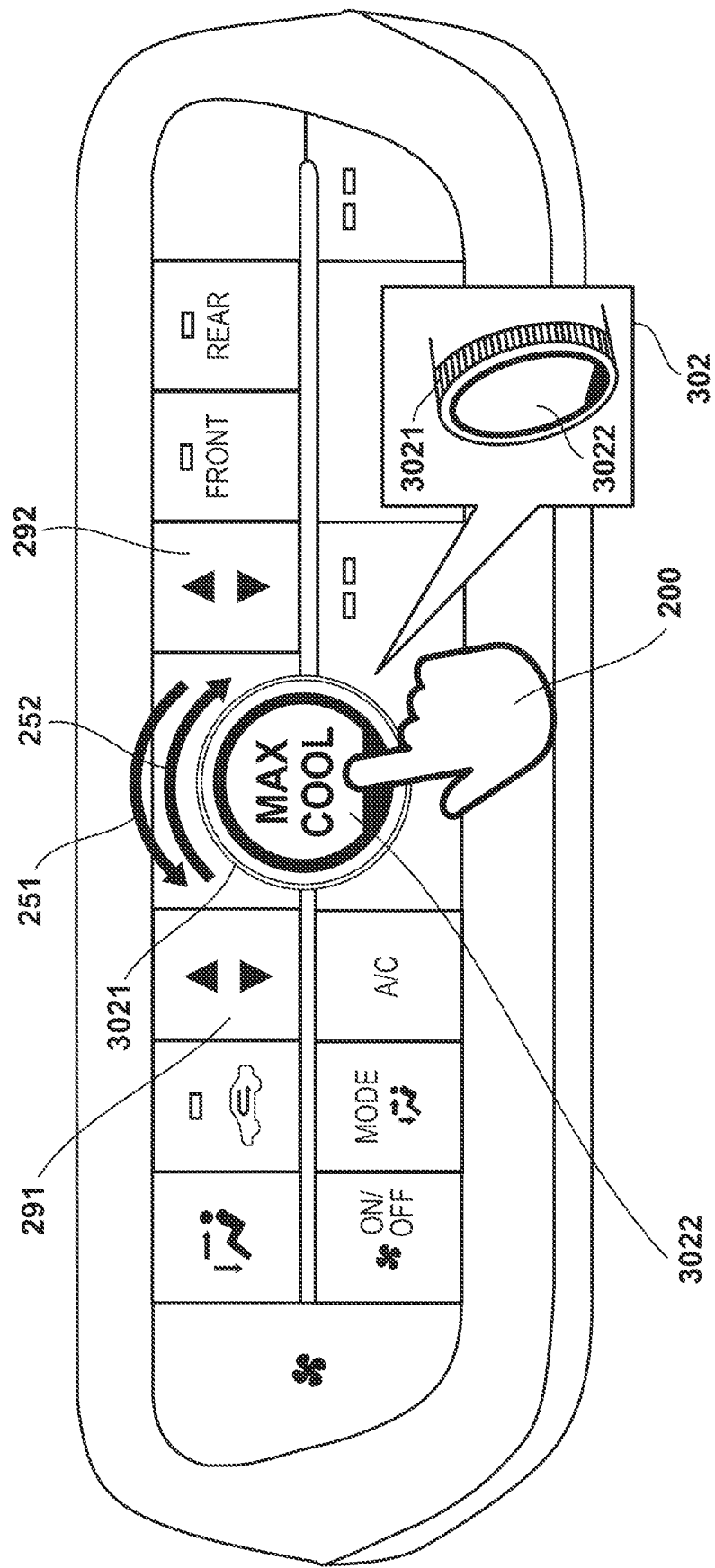
FIG. 2B is a view illustrating an example of an appearance of a first input reception unit according to an embodiment of the present invention.

The first input reception unit 302 is, for example, a switch as illustrated in FIG. 2B, and includes a rotary switch 3021 and a first display unit 3022 provided at an end portion of the rotary switch 3021 in an axial direction.

The rotary switch 3021 is, for example, a dial type switch in which a grip portion gripped by the user rotates around a predetermined axis. Various numerical values and the like can be changed or options can be switched in response to an operation by the user. In addition, a content to be selected can be determined by pressing the first display unit 3022 in the axial direction to physically move the first display unit 3022 in the axial direction.

The first display unit 3022 is a touch panel that is arranged adjacent to the rotary switch 3021 and includes a capacitance sensor for detecting a contact operation by the user. The capacitance sensor included in the first display unit 3022 is surrounded by the grip portion of the rotary switch 3021 and is arranged on an extension line of the predetermined axis. An input can be detected based on a detection result of the capacitance sensor, and various instructions can be input in response to an operation by the user. The first display unit 3022 can also perform various displays.

The first control unit 301 causes the first display unit 3022 to display recommended operation information based on the temperature inside the vehicle 10 detected by the temperature detection unit 320. The recommended operation information is information indicating an operation recommended according to an internal environment of the vehicle 10, and is, for example, a recommendation icon indicating a content of the recommended operation. A specific example of the recommended operation information will be described later. The user viewing the recommended operation information can intuitively recognize what operation is recommended.

The first control unit 301 performs an operation corresponding to the recommended operation information in response to pressing or touching of the first display unit 3022. This makes it possible to perform the recommended operation suitable for the current in-vehicle environment (temperature) at an early stage.

The first recording unit 303 is one or more memories such as a read only memory (ROM), a random access memory (RAM), and/or a hard disk drive. The ROM stores a program or the like that does not need to be changed. The RAM temporarily stores a program and data supplied from the hard disk drive, data supplied from the outside via a communication unit (not illustrated), and the like. The hard disk drive stores various data. In addition, the first recording unit 303 records a setting value of the operation performed according to the operation instruction, and the first control unit 301 can perform various operations (a preset operation, a customized operation, and the like) by reading the setting value corresponding to the operation instruction.

<Configuration of Second Input Reception Device>

The second input reception device 310 includes a second control unit 311, a second input reception unit 312, and a second recording unit 313.

The second control unit 311 is, for example, one or more CPUs, and implements each function of the second input reception device 310 by controlling the entire second input reception device 310 using a computer program or data stored in the second recording unit 313 that is one or more memories. Note that the second input reception device 310 may include one or more pieces of dedicated hardware different from the CPU, and at least a part of processing performed by the CPU may be performed by the dedicated hardware. Examples of the dedicated hardware include an application specific integrated circuit (ASIC) and a field programmable gate array (FPGA).

The second control unit 311 controls an operation of the operation target 20 corresponding to the operation instruction input by the second input reception unit 312. Furthermore, in a case where the operation instruction is recognized based on the voice input via the voice input unit 330, the second control unit 311 can also perform a control of operating the corresponding operation target according to the operation instruction.

The second input reception unit 312 is, for example, a device including a second display unit 3121 as illustrated in FIG. 2A. The second display unit 3121 can display, for example, a navigation screen, a reception screen for receiving an input of the operation instruction, an authentication screen for performing personal authentication of an occupant, a screen showing a detailed content of the recommended operation information, and the like. Since activation of a relatively large display screen such as the second display unit 3121 requires reading of various settings for start of a navigation device or the like, a time required to start the second input reception device 310 is longer than a time required to start the first input reception device 300. The second display unit 3121 is composed of, for example, a liquid crystal display, and can display a graphical user interface (GUI) or the like for receiving a user operation. The second display unit 3121 is composed of, for example, a touch panel, and includes a capacitance sensor for detecting a contact operation by the user. The second display unit 3121 is arranged in a place so as to be operable by the user, such that various instructions can be input by an operation by the user.

The second recording unit 313 is one or more memories such as a ROM, a RAM, and/or a hard disk drive. The ROM stores a program or the like that does not need to be changed. The RAM temporarily stores a program and data supplied from the hard disk drive, data supplied from the outside via a communication unit (not illustrated), and the like. The hard disk drive stores various data such as image data and audio data. In addition, the second recording unit 313 records a setting value of the operation performed according to the operation instruction, and the second control unit 311 can perform various operations (a preset operation, a customized operation, and the like) by reading the setting value corresponding to the operation instruction.

When the engine of the vehicle 10 is started and a power supply is turned on, first, the first input reception device 300 requiring a short time for starting is started, and start of the second input reception device 310 is in progress for a while. A situation in which the temperature inside the vehicle is high or low when a passenger gets on the vehicle 10 and the engine is started is assumed. At this time, the recommended operation information is displayed using the first display unit 3022 of the first input reception device 300 that has been started before the second input reception device 310, and an operation corresponding to the recommended operation information is performed in response to pressing or touching of the first display unit 3022 without waiting until the second input reception device 310 is started.

<Configurations of First Input Reception Unit and Second Input Reception Unit>

Next, configurations of the first input reception unit 302 and the second input reception unit 312 according to an embodiment of the present invention will be described in detail with reference to FIGS. 2A and 2B. For example, the second input reception unit 312 is arranged on a front side of the vehicle between a driver seat and a passenger seat. For example, the first input reception unit 302 is arranged below the second input reception unit 312 between the driver seat and the passenger seat.

In the example illustrated in FIG. 2A, the second input reception unit 312 displays a home button 201, a back button 202, a volume-up button 203, a volume-down button 204, an audio button 205, air conditioning buttons 2061 to 2064, an air volume decrease button 2071, an air volume increase button 2072, an air volume gauge 2073, a CLIMATE button 208, an air conditioning on/off button 209, and the like on the second display unit 3121.

When the home button 201 is pressed (touched) with a hand 200 of the user, transition from the current display screen to a home screen is made. When the back button 202 is pressed (touched) with the hand 200 of the user, the screen returns to the previous screen or the operation is canceled to return to the previous state. When the volume-up button 203 is pressed (touched) with the hand 200 of the user, the volume of music or machine voice is increased. When the volume-down button 204 is pressed (touched) with the hand 200 of the user, the volume of music or machine voice is decreased. When the audio button 205 is pressed (touched) with the hand 200 of the user, an audio function is activated.

When the air conditioning buttons 2061 to 2064 are pressed (touched) with the hand 200 of the user, switching to an air conditioning operation according to the display content is performed. When the air volume decrease button 2071 is pressed (touched) with the hand 200 of the user, an air volume in air conditioning is decreased. When the air volume increase button 2072 is pressed (touched) with the hand 200 of the user, the air volume in air conditioning is increased. The air volume gauge 2073 displays the current level of the air volume. In the illustrated example, the current level of the air volume is level 4 in seven levels.

When the air conditioning on/off button 209 is pressed (touched) with the hand 200 of the user, switching between on and off of air conditioning is performed.

Display contents in a region where displayed are the air conditioning buttons 2061 to 2064, the air volume decrease button 2071, the air volume increase button 2072, the air volume gauge 2073, and the like, are displayed when the user presses (touches) the CLIMATE button 208 with the hand 200.

Next, the first input reception unit 302 will be described in more detail with reference to FIG. 2B. The user can grip the rotary switch 3021 that is a circular dial switch and freely rotate the rotary switch 3021 in a direction indicated by an arrow 251 or an arrow 252. By this rotation operation, for example, a set temperature (target temperature) of the air conditioner or the volume of the audio device can be changed.

In the illustrated example, a display example for setting the level of cooling to a maximum level is illustrated, and "MAX COOL" is displayed. In this display state, when a surface of the first display unit 3022 is pressed or touched, processing for setting the level of cooling to the maximum level is performed. Specifically, the set temperature is changed to a minimum value, and the air volume of the air conditioner is changed to a maximum level. Further, when the window or the sunroof of the vehicle 10 is open, an operation of automatically closing the window or the sunroof is performed.

Figure 3A:
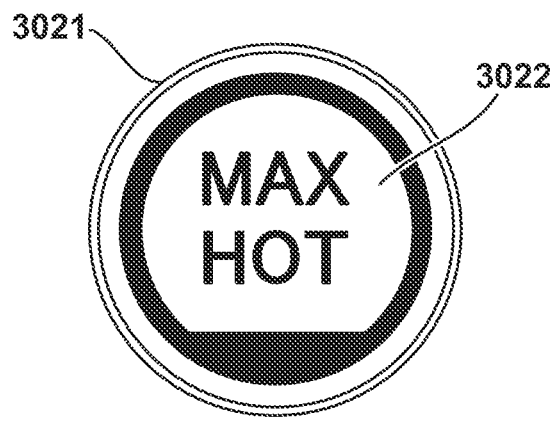
FIGS. 3A to 3D are views illustrating display examples of a first display unit according to an embodiment of the present invention.

Note that various pieces of other information can be displayed on the surface of the first display unit 3022. An example thereof is illustrated in FIGS. 3A to 3D. FIG. 3A illustrates "MAX HOT", which is the opposite of "MAX COOL" in FIG. 2B, which is a display example for setting the level of heating to a maximum level. In this display state, when a surface of the first display unit 3022 is pressed or touched, processing for setting the level of heating to the maximum level is performed. Specifically, the set temperature is changed to a maximum value, and the air volume of the air conditioner is changed to a maximum level. Further, when the window or the sunroof of the vehicle 10 is open, an operation of automatically closing the window or the sunroof is performed.

Figure 3B:
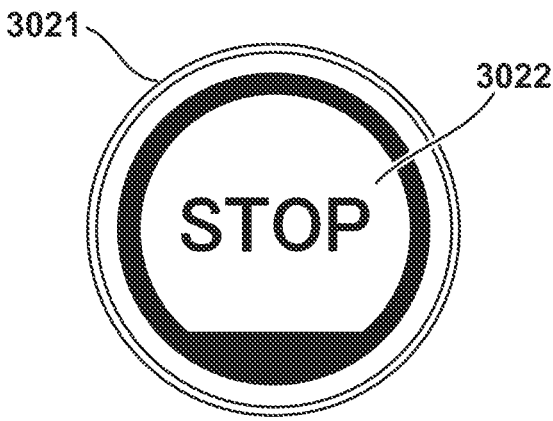

In FIG. 3B, "STOP" is displayed on the surface of the first display unit 3022. In this display state, when the surface of the first display unit 3022 is pressed (touched), the processing that is currently performed can be stopped (canceled).

In a case where the temperature inside the vehicle 10 is excessively high, it is considered that the user wants to perform a cooling operation for cooling the inside of the vehicle 10. Similarly, in a case where the temperature inside the vehicle 10 is excessively low, it is considered that the user wants to perform a heating operation for heating the inside of the vehicle 10.

As an example, configuration can be made such that in a case where the temperature inside the vehicle 10 is equal to or higher than a first predetermined temperature (for example, 28° C.) or is equal to or lower than a second predetermined temperature (for example, 8° C.) lower than the first predetermined temperature, an air-conditioning operation with a third predetermined temperature (for example, 25° C.) between the first predetermined temperature and the second predetermined temperature as a target temperature is recommended.

Figure 3C:
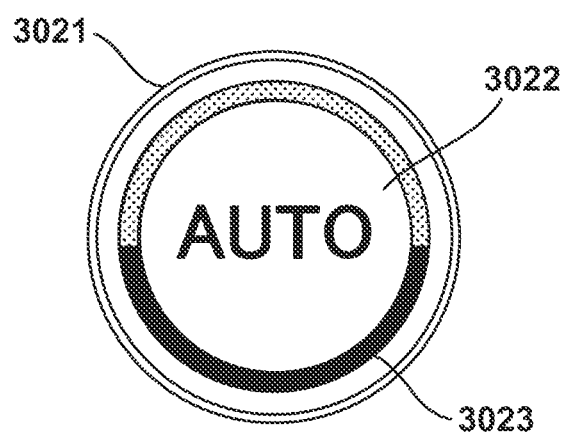

FIG. 3C illustrates an example in which a recommendation icon including characters "AUTO" and a blue sign 3023 indicating that the cooling operation is recommended is displayed on the surface of the first display unit 3022. In a case where the temperature inside the vehicle 10 is equal to or higher than the first predetermined temperature (for example, 28° C.), the recommendation icon as illustrated in FIG. 3C is displayed. The user viewing the blue sign 3023 of the recommendation icon can intuitively recognize that the cooling operation will be performed when the first display unit 3022 is pressed or touched. In a case of "AUTO", the cooling operation, in which the cooling air volume is automatically determined according to a difference between the current temperature inside the vehicle and the target temperature (the third predetermined temperature (for example, 25° C.)), can be performed. For example, the air volume may be increased when the difference is large, and the air volume may be decreased when the difference is small.

Note that in a case where the temperature inside the vehicle 10 is equal to or higher than the first predetermined temperature (for example, 28° C.), "MAX COOL" as illustrated in FIG. 2B may be displayed as the recommendation icon instead of the recommendation icon in FIG. 3C. In this case, the operation corresponding to "MAX COOL" is performed when the recommendation icon of "MAX COOL" is pressed or touched. Alternatively, in a case where the temperature inside the vehicle 10 is equal to or higher than the first predetermined temperature (for example, 28° C.), the recommendation icon in FIG. 3C may be initially displayed, and the user may change the display on the first display unit 3022 to "MAX COOL" by gripping the rotary switch 3021 and rotating the rotary switch 3021 in the direction of the arrow 251.

Figure 3D:
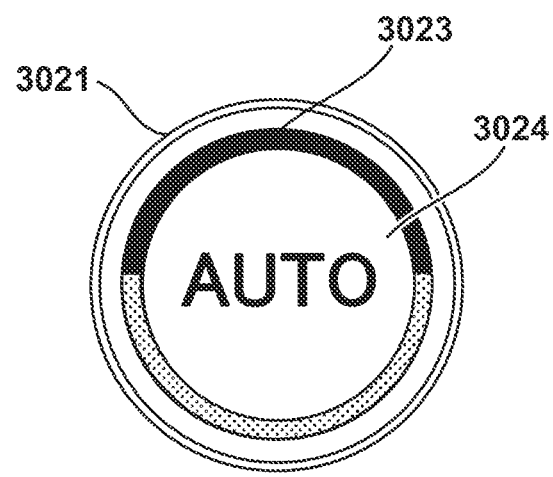

FIG. 3D illustrates an example in which a recommendation icon including characters "AUTO" and a red sign 3024 indicating that the heating operation is recommended is displayed on the surface of the first display unit 3022. In a case where the temperature inside the vehicle 10 is equal to or lower than the second predetermined temperature (for example, 8° C.), the recommendation icon as illustrated in FIG. 3D is displayed. The user viewing the red sign 3024 of the recommendation icon can intuitively recognize that the heating operation will be performed when the first display unit 3022 is pressed or touched. In a case of "AUTO", the heating operation, in which the heating air volume is automatically determined according to a difference between the current temperature inside the vehicle and the target temperature (the third predetermined temperature (for example, 25° C.)), can be performed. For example, the air volume may be increased when the difference is large, and the air volume may be decreased when the difference is small.

Note that in a case where the temperature inside the vehicle 10 is equal to or lower than the second predetermined temperature (for example, 8° C.), "MAX HOT" as illustrated in FIG. 3A may be displayed as the recommendation icon instead of the recommendation icon in FIG. 3D. In this case, the operation corresponding to "MAX HOT" is performed when the recommendation icon of "MAX HOT" is pressed or touched. Alternatively, in a case where the temperature inside the vehicle 10 is equal to or lower than the second predetermined temperature (for example, 8° C.), the recommendation icon in FIG. 3D may be initially displayed, and the user may change the display on the first display unit 3022 to "MAX HOT" by gripping the rotary switch 3021 and rotating the rotary switch 3021 in the direction of the arrow 252.

The first display unit 3022 can also perform various other displays, and for example, can display the current room temperature or an analog clock.

<Processing>

Next, a procedure of processing performed by the input reception system according to the present embodiment will be described with reference to flowcharts of FIGS. 4 and 5. The processing according to the present embodiment starts in response to the start of the engine of the vehicle 10.

In S401, the first input reception device 300 is started according to the start of the engine of the vehicle 10.

In S402, the first control unit 301 of the first input reception device 300 acquires information regarding the temperature inside the vehicle 10 detected by the temperature detection unit 320.

In S403, the first control unit 301 determines the recommended operation information to be displayed on the first display unit 3022 of the first input reception device 300 based on the temperature inside the vehicle 10 detected by the temperature detection unit 320, and displays the determined recommended operation information on the first display unit 3022. Details of the processing of S403 will be described later with reference to FIG. 5.

In S404, the first control unit 301 determines whether or not the first display unit 3022 has been pressed or touched. In a case where the first display unit 3022 has been pressed or touched, the processing proceeds to S405. On the other hand, in a case where the first display unit 3022 has not been pressed or touched, the first control unit 301 performs waiting.

In S405, the first control unit 301 performs an operation corresponding to the recommended operation information. At this time, in a case where the operation corresponding to the recommended operation information is the operation of the air conditioner, the operation of closing all the openable and closable bodies such as the window and the sunroof provided in the vehicle 10 may also be performed together.

In parallel with the processes of S404 and S405, the processes of S406 and subsequent steps are also performed.

In S406, the second input reception device 310 is started with a delay. In S407, the second control unit 311 of the second input reception device 310 displays, on the second display unit 3121, detailed information of the recommended operation information displayed on the first display unit 3022. Information regarding the recommended operation information displayed on the first display unit 3022 can be acquired from the first input reception device 300. A specific example of the detailed information of the recommended operation information will be described later with reference to FIGS. 6 and 7. The user can understand the content of the recommended operation currently displayed on the first display unit 3022 by checking a content displayed on the second display unit 3121 that is a screen larger than the first display unit 3022.

In S408, the first control unit 301 of the first input reception device 300 determines whether or not a predetermined time (for example, 10 seconds) has elapsed from the start of the second input reception device 310. The first control unit 301 can determine whether or not a predetermined time has elapsed from the start of the second input reception device 310 by measuring the elapsed time with a timer. Note that, in this processing, the second input reception device 301 may perform the determination by measuring the elapsed time from the start with the timer by itself, and transmit information indicating that the predetermined time has elapsed to the first input reception device 300, such that the first control unit 301 of the first input reception device 300 performs determination based on the received information.

In S409, the first control unit 301 of the first input reception device 300 determines whether or not the recommended operation information displayed on the first display unit 3022 has already been pressed or touched and the operation corresponding to the recommended operation information has been performed at a time point at which the predetermined time has elapsed from the start of the second input reception device 310. In a case where the operation has already been performed, the processing is terminated. On the other hand, in a case where the operation has not been performed yet, the processing proceeds to S410.

In S410, the first control unit 301 of the first input reception device 300 determines whether or not the temperature inside the vehicle 10 is outside a predetermined range. Specifically, in a case where the temperature detected by the temperature detection unit 320 is equal to or higher than a fourth predetermined temperature (for example, 30° C.) higher than the first predetermined temperature (for example, 28° C.), or is equal to or lower than a fifth predetermined temperature (for example, 5° C.) lower than the second predetermined temperature (for example, 8° C.), the temperature can be outside the predetermined range. That is, it can be determined that the temperature is within the predetermined range in a case where the temperature is lower than the fourth predetermined temperature (for example, 30° C.) and is higher than the fifth predetermined temperature (for example, 5° C.). In a case where the temperature inside the vehicle 10 is outside the predetermined range, the processing proceeds to S411. On the other hand, in a case where the temperature inside the vehicle 10 is within the predetermined range, the processing proceeds to S412.

In S411, the first control unit 301 of the first input reception device 300 continues to display the recommended operation information displayed on the first display unit 3022. In a case where the temperature inside the vehicle is extremely high or low, the first control unit 301 continues to display the recommended operation information and waits for an operation input even when the predetermined time has elapsed from the start of the second input reception device 310. After the processing of S411, the processing returns to S404.

In S412, the first control unit 301 of the first input reception device 300 erases the recommended operation information displayed on the first display unit 3022. In a case where the temperature inside the vehicle is not extremely high or low, it is assumed that the user does not intend to accept and perform the recommended operation, and thus, the displayed recommended operation information is erased. As a result, it is possible to prevent excessive recommendation from continuing. Accordingly, the series of processes in FIG. 4 is terminated.

Next, details of the processing of determining and displaying the recommended operation information in S403 will be described with reference to the flowchart of FIG. 5.

In S4031, the first control unit 301 of the first input reception device 300 determines whether or not the temperature inside the vehicle 10 is equal to or higher than the first predetermined temperature (for example, 28° C.). In a case where the temperature is equal to or higher than the first predetermined temperature (for example, 28° C.), the processing proceeds to S4033. On the other hand, in a case where the temperature is lower than the first predetermined temperature (for example, 28° C.), the processing proceeds to S4032.

In S4032, the first control unit 301 of the first input reception device 300 determines whether or not the temperature inside the vehicle 10 is equal to or lower than the second predetermined temperature (for example, 8° C.). In a case where the temperature is equal to or lower than the second predetermined temperature (for example, 8° C.), the processing proceeds to S4033. On the other hand, in a case where the temperature is higher than the second predetermined temperature (for example, 8° C.), the processing proceeds to S4035.

In S4033, the first control unit 301 of the first input reception device 300 sets the third predetermined temperature (for example, 25° C.) between the first predetermined temperature (for example, 28° C.) and the second predetermined temperature (for example, 8° C.) as a target temperature in the air conditioner (not illustrated) of the vehicle 10.

In S4034, in a case where the temperature is equal to or higher than the first predetermined temperature (for example, 28° C.), the first control unit 301 of the first input reception device 300 determines the recommendation icon as illustrated in FIG. 3C as the recommended operation information in order to recommend the cooling operation, and displays the recommendation icon on the first display unit 3022. In addition, in a case where the temperature is equal to or lower than the second predetermined temperature (for example, 8° C.), the first control unit 301 of the first input reception device 300 determines the recommendation icon as illustrated in FIG. 3D as the recommended operation information in order to recommend the heating operation, and displays the recommendation icon on the first display unit 3022. Here, when the recommendation icon is displayed, for example, the blue sign 3023 or red sign 3024 may be displayed in a highlighted manner such as blinking in order to prompt execution of the recommended operation.

In S4035, the first control unit 301 of the first input reception device 300 determines that there is no operation to be recommended, and determines to hide the recommended operation information. In a case where the processing has passed through S4035, the processing after S404 in FIG. 4 is not performed, and the processing is terminated. Accordingly, the series of processes in FIG. 5 is terminated.

Figure 4:
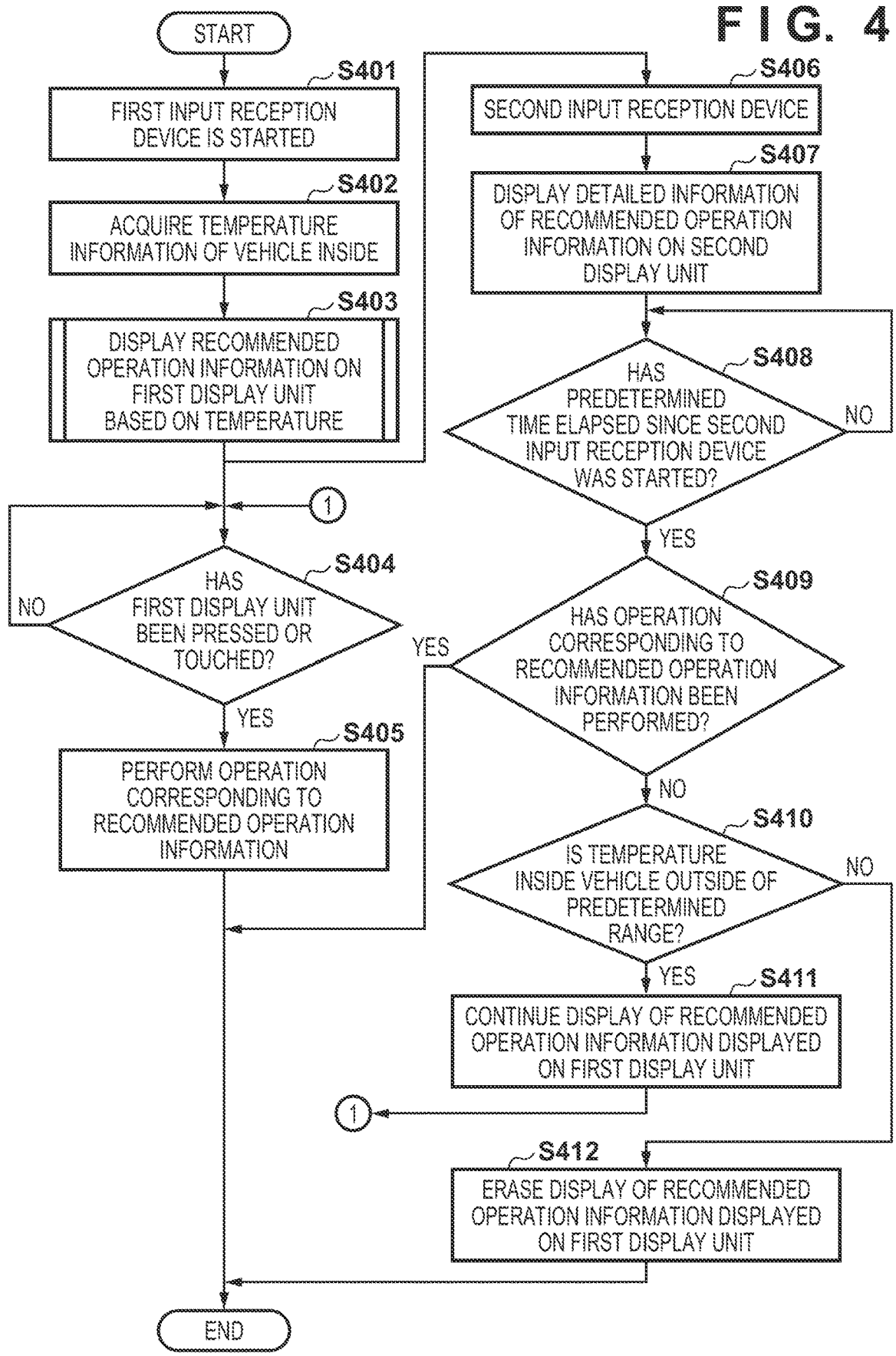
FIG. 4 is a flowchart illustrating a procedure of processing performed by the input reception system according to an embodiment of the present invention.
Figure 5:
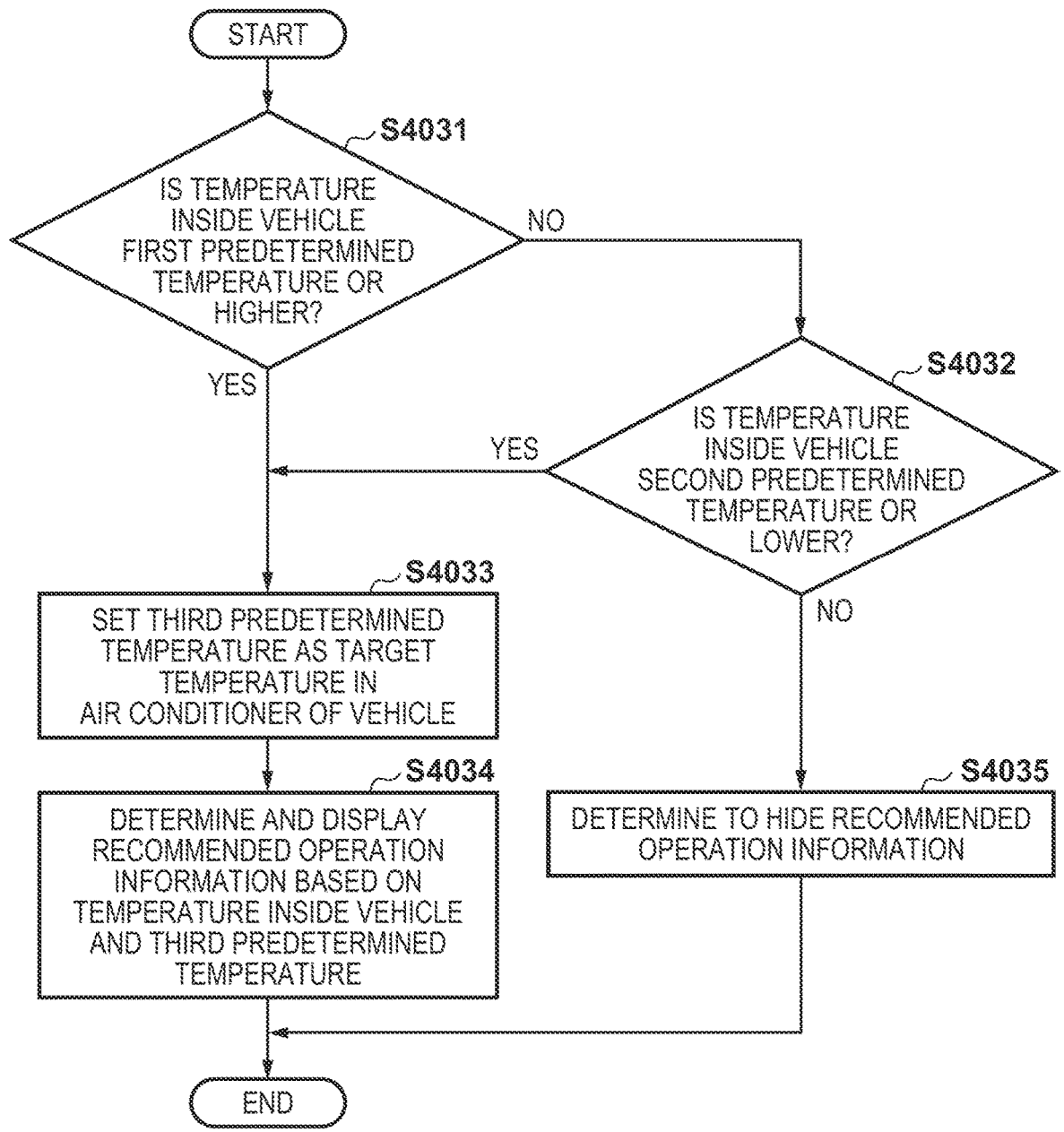
FIG. 5 is a flowchart illustrating a procedure of processing of determining and displaying recommended operation information performed by the input reception system according to an embodiment of the present invention.

Each process of the flowcharts of FIGS. 4 and 5 is merely an example, and various modifications such as omitting some processes, changing the order of processing, and the like can be made.

<Example of Detailed Information of Recommended Operation Information>

Here, an example of the detailed information of the recommended operation information displayed by the second input reception device 310 in S407 will be described with reference to FIGS. 6 and 7.

Figure 6:
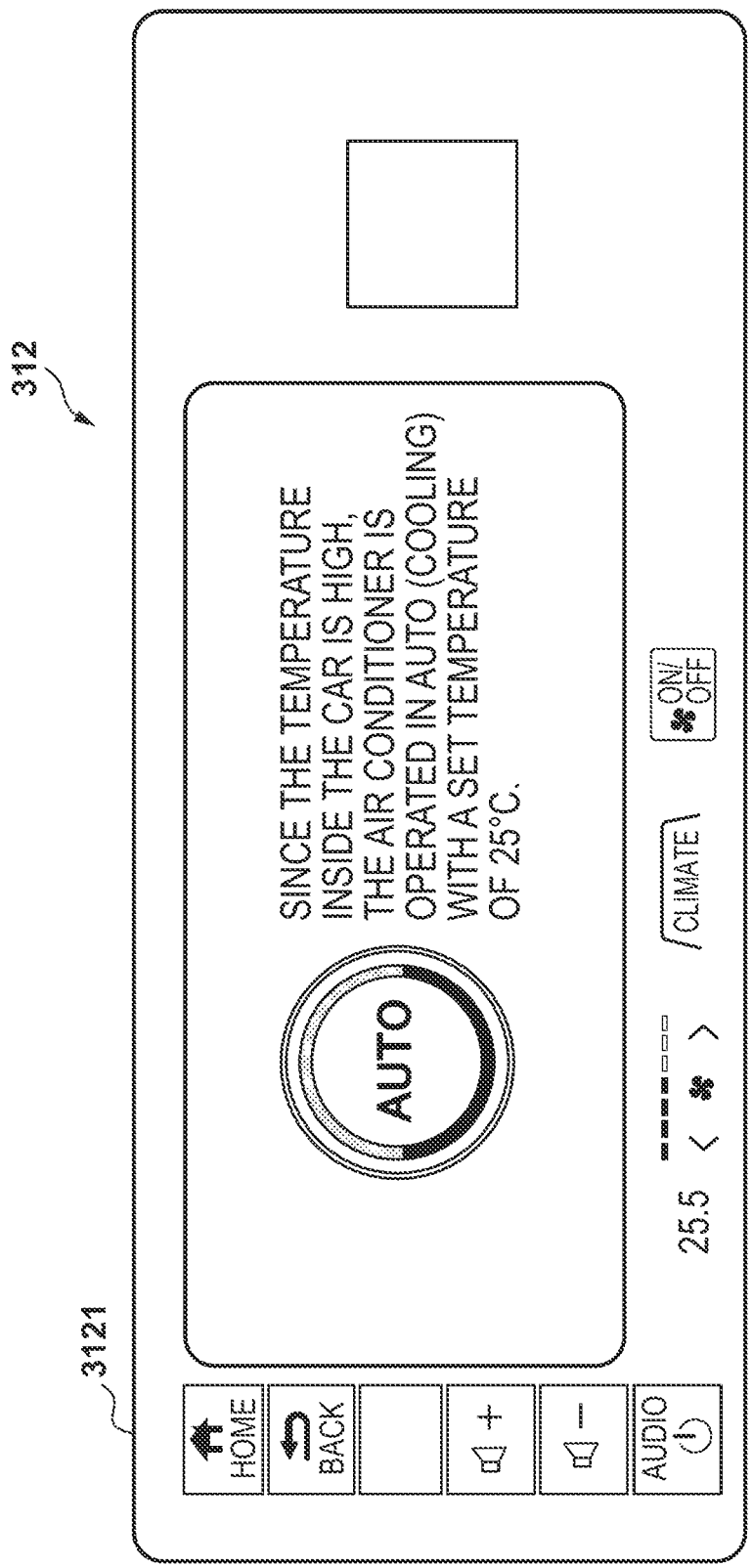
FIG. 6 is a diagram illustrating an example of detailed information of recommended operation information regarding a cooling operation according to an embodiment of the present invention.

FIG. 6 illustrates an example of displaying the detailed information in a case where the recommendation icon related to the cooling operation as illustrated in FIG. 3C is displayed on the first display unit 3022 of the first input reception device 300. Since the second display unit 3121 of the second input reception device 310 is a screen larger than the first display unit 3022 of the first input reception device 300, it is possible to display more pieces of information. In the illustrated example, an explanatory sentence "Since the temperature inside the car is high, the air conditioner is operated in AUTO (cooling) with a set temperature of 25° C." of the recommendation icon is displayed together with the recommendation icon as illustrated in FIG. 3C. The set temperature of 25° C. corresponds to the third predetermined temperature.

Figure 7:
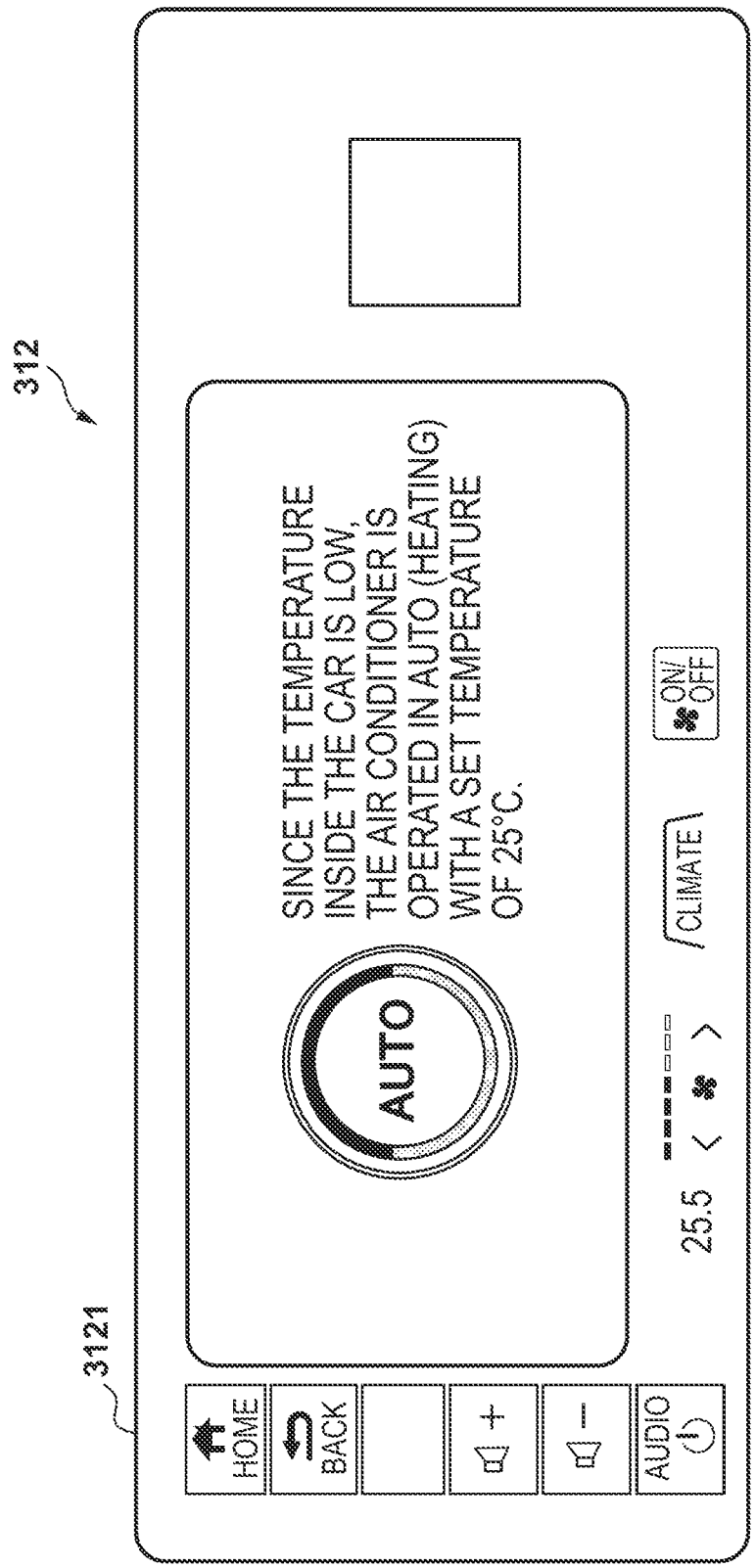
FIG. 7 is a diagram illustrating an example of detailed information of recommended operation information regarding a heating operation according to an embodiment of the present invention.

Similarly, FIG. 7 illustrates an example of displaying the detailed information in a case where the recommendation icon related to the heating operation as illustrated in FIG. 3D is displayed on the first display unit 3022 of the first input reception device 300. In the illustrated example, an explanatory sentence "Since the temperature inside the car is low, the air conditioner is operated in AUTO (heating) with a set temperature of 25° C." of the recommendation icon is displayed together with the recommendation icon as illustrated in FIG. 3D. The set temperature of 25° C. corresponds to the third predetermined temperature.

By reading these explanatory sentences, it is possible to easily understand what operation is recommended by the recommended operation information currently displayed on the first display unit 3022. Pressing or touching the first display unit 3022 after confirming the detailed information can prevent the user from erroneously performing an unintended operation.

As described above, in the present embodiment, the recommended operation information is displayed on the first display unit of the first input reception device that is quickly started based on the temperature inside the vehicle, and the operation corresponding to the recommended operation information is performed in response to pressing or touching of the first display unit. As a result, even before the start of the second input reception device that is slowly started, the user can input the operation instruction according to the in-vehicle environment at an early stage after the engine is started.

Modification Example

In the above-described embodiment, the description has been given assuming that the third predetermined temperature (for example, 25° C.) is a fixed set value, but the third predetermined temperature may be variable. As illustrated in FIG. 2B, temperature change switches 291 and 292 for changing a value of the third predetermined temperature may be further provided in the first input reception device 300. The temperature change switch 291 is, for example, a switch for operation at the passenger seat, and the temperature change switch 292 is, for example, a switch for operation at the driver seat. When a portion in the vicinity of an upward triangle in any of the switches is physically pressed, the third predetermined temperature can be changed to a value higher than the current temperature. Conversely, when a portion in the vicinity of a downward triangle in any of the switches is physically pressed, the third predetermined temperature can be changed to a value lower than the current temperature.

For example, in a case where the current temperature inside the vehicle 10 is 29° C. and the preset third predetermined temperature is 25° C., for example, the recommendation icon related to the cooling operation illustrated in FIG. 3C is displayed on the first display unit 3022. It is assumed that the third predetermined temperature is changed to 30° C. higher than the first predetermined temperature (for example, 25° C.) by the operation of the temperature change switch 291 or 292 in this state. In this case, the temperature inside the vehicle 10 (29° C.)<the third predetermined temperature (30° C.), and thus the target temperature is higher than the current temperature inside the vehicle. Therefore, the recommended operation information of the first display unit 3022 is changed from the recommendation icon related to the cooling operation illustrated in FIG. 3C to the recommendation icon related to the heating operation illustrated in FIG. 3D. As a result, it can be recognized from a change in display color that the third predetermined temperature exceeds the temperature inside the vehicle 10 by the operation of the temperature change switch 291 or 292.

Similarly, in a case where the current temperature inside the vehicle 10 is 7° C. and the preset third predetermined temperature is 25° C., for example, the recommendation icon related to the heating operation illustrated in FIG. 3D is displayed on the first display unit 3022. It is assumed that the third predetermined temperature is changed to 6° C. lower than the second predetermined temperature (for example, 8° C.) by the operation of the temperature change switch 291 or 292 in this state. In this case, the temperature inside the vehicle 10 (7° C.)>the third predetermined temperature (6° C.), and thus the target temperature is lower than the current temperature inside the vehicle. Therefore, the recommended operation information of the first display unit 3022 is changed from the recommendation icon related to the heating operation illustrated in FIG. 3D to the recommendation icon related to the cooling operation illustrated in FIG. 3C. As a result, it can be recognized from the change in display color that the third predetermined temperature is lower than the temperature inside the vehicle 10 by the operation of the temperature change switch 291 or 292.

Figure 8:
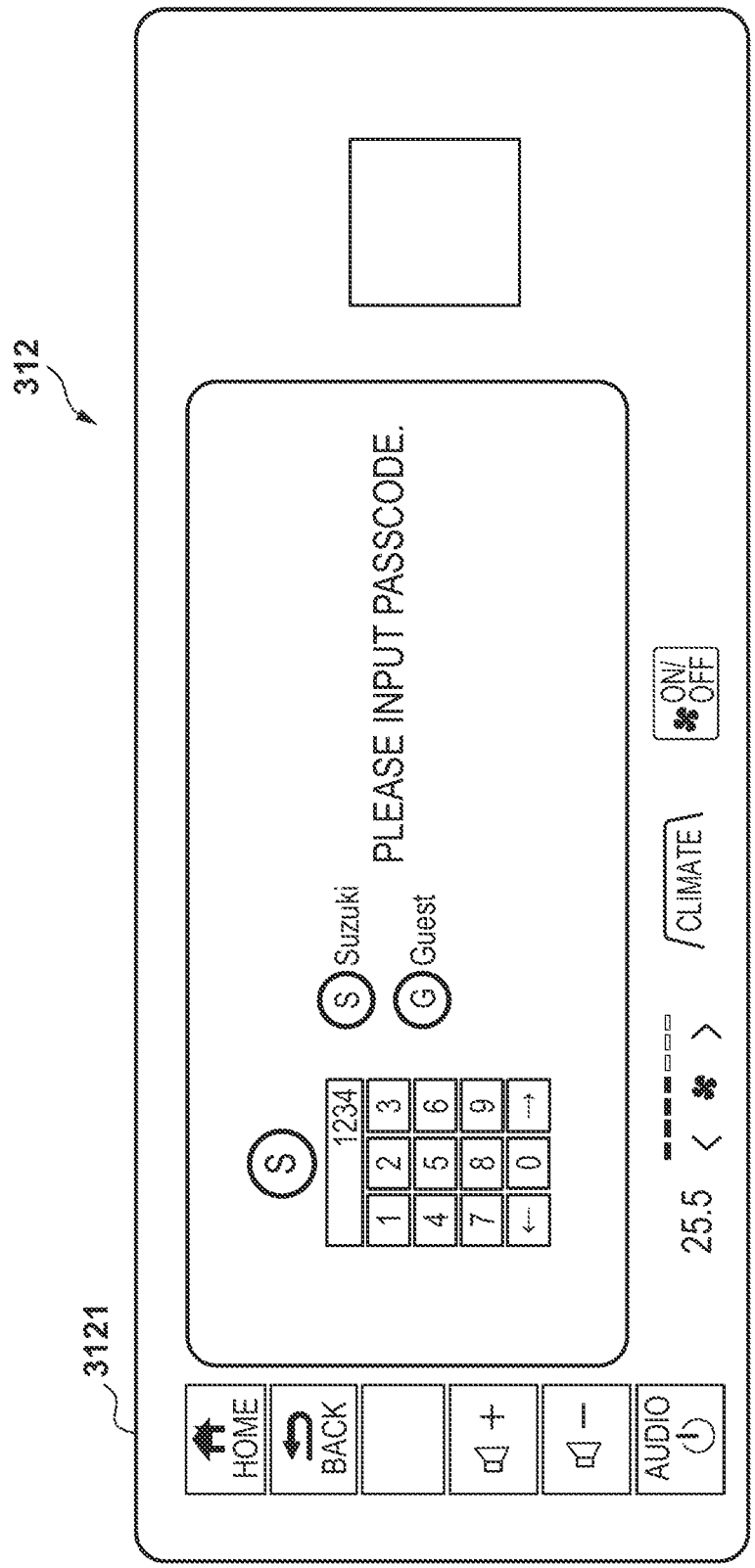
FIG. 8 is a diagram illustrating an example of a personal authentication screen according to an embodiment of the present invention.

Furthermore, the second input reception device 310 may be able to authenticate a person based on information input via the second input reception unit 312 (particularly, the second display unit 3121). Here, FIG. 8 is a diagram illustrating an example of a personal authentication screen. In the illustrated example, a screen for personal authentication in which the user is selected and a passcode of the selected user is input is displayed on the second display unit 3121. In the illustrated example, the user (Suzuki) is selected and the passcode of a predetermined number of digits is input by touching a numeric keypad. Once the personal authentication is completed, various settings specific to the user can be read. For example, the third predetermined temperature is 25° C. by default, but in a case where the third predetermined temperature of a specific user (Suzuki) is set to 23° C. by previous change setting using the temperature change switch 291 or 292, the third predetermined temperature of 23° C. can be read and used for processing. Note that it is also possible to use the vehicle 10 in a guest mode without performing the personal authentication, and in this case, a default value (for example, 25° C.) is used as the third predetermined temperature.

The first control unit 301 of the first input reception device 300 sets the third predetermined temperature to a predetermined value (default value) after the second input reception device 310 is started and before the person is authenticated (for example, during use in the guest mode), and sets the third predetermined temperature to a customized value corresponding to the authenticated person after the second input reception device 310 is started and the person is authenticated. As a result, it is possible to perform an operation more suitable for an individual user.

Note that the operation of changing the third predetermined temperature is not limited to the operation by the temperature change switch 291 or 292, and the change operation may be performed via the display screen of the second display unit 3121.

In addition, when the operation corresponding to the recommended operation information is performed in S405, "STOP" as illustrated in FIG. 3B may be displayed on the first display unit 3022, and the processing that is currently performed may be stopped by pressing or touching the first display unit 3022. As a result, it is possible to reflect the user's intention to stop the processing even after the processing starts to be performed.

In addition, the recommended operation information may be displayed only once after the engine of the vehicle 10 is started. That is, in a case where the recommended operation information has been erased after the lapse of the predetermined time from the start of the second input reception device 310, the recommended operation information may not be displayed again during the subsequent driving operation (traveling). In a case where the recommended operation information is not displayed because the condition is not met when the engine is started, the recommended operation information may be displayed only once for a predetermined time (for example, 10 seconds) when the condition is met during the subsequent driving operation (traveling). In this manner, excessive recommendation can be avoided by making a recommendation only once after the engine is started and before the engine is stopped.

Other Embodiments

In addition, a program for implementing one or more functions described in the embodiments is supplied to a system or device through a network or a storage medium, and one or more processors in a computer of the system or device can read and execute the program. The present invention is also achievable by such an aspect.

The invention is not limited to the foregoing embodiments, and various variations/changes are possible within the spirit of the invention.

Summary of Embodiment

An input reception system (for example, 30) according to a first aspect includes:
first and second input reception devices (for example, 300 and 310) configured to receive an input of an operation instruction for operating an operation target of a vehicle (for example, 10); and a temperature detection unit (for example, 320) configured to detect a temperature inside the vehicle, in which
the first input reception device includes:
a first input reception unit (for example, 302) configured to receive the input of the operation instruction by being pressed or touched, and including a first display unit (for example, 3022) configured to display information; and
a first control unit (for example, 301) configured to control the operation of the operation target based on the input of the operation instruction received via the first input reception unit,
a time required to start the second input reception device is longer than a time required to start the first input reception device, and
the first control unit causes the first display unit to display recommended operation information (for example, FIG. 3C or 3D) based on the temperature detected by the temperature detection unit, and performs an operation corresponding to the recommended operation information in response to pressing or touching of the first display unit.

As a result, even before the start of the second input reception device that is slowly started, the user can input the operation instruction according to the in-vehicle environment at an early stage after the engine is started.

In the input reception system (for example, 30) according to a second aspect, the first control unit causes the recommended operation information to be displayed after the start of the first input reception device and before the start of the second input reception device.

As a result, before the start of the second input reception device that is slowly started, the user can input the operation instruction according to the in-vehicle environment at an early stage after the engine is started.

In the input reception system (for example, 30) according to a third aspect,
the first control unit:
sets, in a case where the temperature detected by the temperature detection unit is equal to or higher than a first predetermined temperature (for example, 28° C.) or is equal to or lower than a second predetermined temperature (for example, 8° C.) lower than the first predetermined temperature, a third predetermined temperature (for example, 25° C.) between the first predetermined temperature and the second predetermined temperature as a target temperature in an air conditioner of the vehicle; and
determines and displays the recommended operation information (for example, FIG. 3C or 3D) based on the temperature detected by the temperature detection unit and the third predetermined temperature.

As a result, it is possible to display appropriate recommended operation information (for example, an AUTO operation (cooling) or an AUTO operation (heating)) according to whether the temperature inside the vehicle is higher or lower than the target temperature (third predetermined temperature).

In the input reception system (for example, 30) according to a fourth aspect,
the first control unit:
causes, in a case where the temperature detected by the temperature detection unit is equal to or higher than the first predetermined temperature, recommended operation information (for example, FIG. 3C) for recommending a cooling operation as the recommended operation information to be displayed; and
performs the cooling operation whose target temperature is the third predetermined temperature in response to pressing or touching of the first display unit.

As a result, it is possible to recommend and perform an appropriate operation that meets the needs of the user according to the temperature inside the vehicle.

In the input reception system (for example, 30) according to a fifth aspect,
the first control unit performs an operation of closing a plurality of openable and closable bodies of the vehicle together with the cooling operation.

Accordingly, the effect of the cooling operation can be enhanced.

In the input reception system (for example, 30) according to a sixth aspect,
the first control unit:
causes, in a case where the temperature detected by the temperature detection unit is equal to or lower than the second predetermined temperature, recommended operation information for recommending a heating operation as the recommended operation information to be displayed; and
performs the heating operation whose target temperature is the third predetermined temperature in response to pressing or touching of the first display unit.

As a result, it is possible to recommend and perform an appropriate operation that meets the needs of the user according to the temperature inside the vehicle.

In the input reception system (for example, 30) according to a seventh aspect,
the first control unit performs an operation of closing a plurality of openable and closable bodies of the vehicle together with the heating operation.

Accordingly, the effect of the heating operation can be enhanced.

In the input reception system (for example, 30) according to an eighth aspect,
the first input reception device further includes a temperature change switch (for example, 291 and 292) for changing a value of the third predetermined temperature, and
the first control unit changes the value of the third predetermined temperature according to an operation of the temperature change switch.

As a result, it is possible to freely change the setting so as to achieve the target temperature according to the user's preference.

In the input reception system (for example, 30) according to a ninth aspect,
the first control unit changes the recommended operation information according to whether the temperature detected by the temperature detection unit is higher or lower than the changed third predetermined temperature.

When the third predetermined temperature as the target temperature is changed, the current temperature inside the vehicle that is lower (higher) than the third predetermined temperature may become higher (lower) than the third predetermined temperature. In such a case, the recommended operation information may be automatically changed from the cooling operation to the heating operation or from the heating operation to the cooling operation according to the current temperature inside the vehicle becoming lower or higher than the third predetermined temperature. As a result, the user can easily recognize that the third predetermined temperature has been excessively changed.

In the input reception system (for example, 30) according to a tenth aspect,
the second input reception device includes:
a second input reception unit (for example, 312) configured to receive the input of the operation instruction by being pressed or touched, and including a second display unit configured to display information; and
a second control unit (for example, 311) configured to control the operation of the operation target based on the input of the operation instruction received via the second input reception unit, and
the second control unit causes the second display unit to display detailed information (for example, FIG. 6 or 7) of the recommended operation information after the start of the second input reception device.

As a result, although the recommended operation information displayed on the first display unit of the first input reception device cannot indicate a large amount of information because of a relatively small display area, as information indicating details thereof is displayed on the second display unit of the second input reception device having a relatively large display area, it is possible to easily understand what operation is currently recommended.

In the input reception system (for example, 30) according to an eleventh aspect,
the second control unit is configured to change a value of the third predetermined temperature according to an operation of the second input reception unit of the second input reception device.

As a result, the target temperature of the air conditioner can be changed using the second input reception device, and the change can be made according to the user's preference.

In the input reception system (for example, 30) according to a twelfth aspect,
the first control unit erases the recommended operation information displayed on the first display unit when a predetermined time has elapsed from the start of the second input reception device.

In a case where the recommended operation has not been performed even after the lapse of a certain period of time from the start of the second input reception device, there is a possibility that unnecessary recommendation for the user has been made. Therefore, it is possible to avoid continuation of unnecessary recommendation by erasing the displayed information.

In the input reception system (for example, 30) according to a thirteenth aspect,
in a case where the temperature detected by the temperature detection unit is equal to or higher than a fourth predetermined temperature (for example, 30° C.) higher than the first predetermined temperature, or is equal to or lower than a fifth predetermined temperature (for example, 5° C.) lower than the second predetermined temperature,
the first control unit continues to display the recommended operation information displayed on the first display unit even when the predetermined time has elapsed from the start of the second input reception device.

Even when a certain period of time has elapsed from the start of the second input reception device, the recommended operation should be performed in a situation where the temperature inside the vehicle is extremely high or low, and thus the recommended operation information is continued to be displayed. As a result, even in a case where an instruction for performing the recommended operation cannot be input within a predetermined time for some reason (for example, in a case where the user goes out of the vehicle after the engine is started and loads baggage into the trunk), the recommended operation information is continued to be displayed, such that the instruction for performing the recommended operation can be input later.

In the input reception system (for example, 30) according to a fourteenth aspect,
the second control unit is configured to authenticate a person based on information input via the second input reception unit (for example, FIG. 8),
the first control unit sets:
the third predetermined temperature to a predetermined value (default value) after the second input reception device is started and before the person is authenticated; and
the third predetermined temperature to a value (customized value) corresponding to the authenticated person after the second input reception device is started and the person is authenticated.

As a result, it is possible to set an appropriate target temperature (third predetermined temperature) of the air conditioner according to the user's preference.

In the input reception system (for example, 30) according to a fifteenth aspect, the recommended operation information is a recommendation icon indicating a content of a recommended operation.

As a result, it is possible to intuitively recognize the content of the recommended operation.

In a control method of an input reception system (for example, 30) according to a sixteenth aspect including first and second input reception devices (for example, 300 and 310) configured to receive an input of an operation instruction for operating an operation target of a vehicle (for example, 10), and a temperature detection unit (for example, 320) configured to detect a temperature inside the vehicle, the first input reception device includes:
a first input reception unit (for example, 302) configured to receive the input of the operation instruction by being pressed or touched, and including a first display unit (for example, 3022) configured to display information; and
a first control unit (for example, 301) configured to control the operation of the operation target based on the input of the operation instruction received via the first input reception unit,
a time required to start the second input reception device is longer than a time required to start the first input reception device, and
the control method includes:
causing the first display unit to display recommended operation information based on the temperature detected by the temperature detection unit (for example, S403); and
performing an operation corresponding to the recommended operation information in response to pressing or touching of the first display unit (for example, S404 and S405).

As a result, even before the start of the second input reception device that is slowly started, the user can input the operation instruction according to the in-vehicle environment at an early stage after the engine is started.

According to the present invention, the user can input the operation instruction according to the in-vehicle environment at an early stage after the engine is started.

What is claimed is:

1. An input reception system comprising:
first and second input reception devices configured to receive an input of an operation instruction for operating an operation target of a vehicle; and a temperature detection unit configured to detect a temperature inside the vehicle,
wherein the first input reception device includes:
a first input reception unit configured to receive the input of the operation instruction by being pressed or touched, and including a first display unit configured to display information; and
a first control unit configured to control the operation of the operation target based on the input of the operation instruction received via the first input reception unit,
a time required to start the second input reception device is longer than a time required to start the first input reception device, and
the first control unit causes the first display unit to display recommended operation information based on the temperature detected by the temperature detection unit, and performs an operation corresponding to the recommended operation information in response to pressing or touching of the first display unit.

2. The input reception system according to claim 1, wherein the first control unit causes the recommended operation information to be displayed after the start of the first input reception device and before the start of the second input reception device.

3. The input reception system according to claim 1, wherein
the first control unit:
sets, in a case where the temperature detected by the temperature detection unit is equal to or higher than a first predetermined temperature or is equal to or lower than a second predetermined temperature lower than the first predetermined temperature, a third predetermined temperature between the first predetermined temperature and the second predetermined temperature as a target temperature in an air conditioner of the vehicle; and
determines and displays the recommended operation information based on the temperature detected by the temperature detection unit and the third predetermined temperature.

4. The input reception system according to claim 3, wherein
the first control unit:
causes, in a case where the temperature detected by the temperature detection unit is equal to or higher than the first predetermined temperature, recommended operation information for recommending a cooling operation as the recommended operation information to be displayed; and
performs the cooling operation whose target temperature is the third predetermined temperature in response to pressing or touching of the first display unit.

5. The input reception system according to claim 4, wherein the first control unit performs an operation of closing a plurality of openable and closable bodies of the vehicle together with the cooling operation.

6. The input reception system according to claim 3, wherein
the first control unit:
causes, in a case where the temperature detected by the temperature detection unit is equal to or lower than the second predetermined temperature, recommended operation information for recommending a heating operation as the recommended operation information to be displayed; and
performs the heating operation whose target temperature is the third predetermined temperature in response to pressing or touching of the first display unit.

7. The input reception system according to claim 6, wherein the first control unit performs an operation of closing a plurality of openable and closable bodies of the vehicle together with the heating operation.

8. The input reception system according to claim 3, wherein:
the first input reception device further includes a temperature change switch for changing a value of the third predetermined temperature; and
the first control unit changes the value of the third predetermined temperature according to an operation of the temperature change switch.

9. The input reception system according to claim 8, wherein the first control unit changes the recommended operation information according to whether the temperature detected by the temperature detection unit is higher or lower than the changed third predetermined temperature.

10. The input reception system according to claim 3, wherein
the second input reception device includes:
a second input reception unit configured to receive the input of the operation instruction by being pressed or touched, and including a second display unit configured to display information; and
a second control unit configured to control the operation of the operation target based on the input of the operation instruction received via the second input reception unit, and
the second control unit causes the second display unit to display detailed information of the recommended operation information after the start of the second input reception device.

11. The input reception system according to claim 10, wherein the second control unit is configured to change a value of the third predetermined temperature according to an operation of the second input reception unit of the second input reception device.

12. The input reception system according to claim 10, wherein the first control unit erases the recommended operation information displayed on the first display unit when a predetermined time has elapsed from the start of the second input reception device.

13. The input reception system according to claim 12, wherein
in a case where the temperature detected by the temperature detection unit is equal to or higher than a fourth predetermined temperature higher than the first predetermined temperature, or is equal to or lower than a fifth predetermined temperature lower than the second predetermined temperature,
the first control unit continues to display the recommended operation information displayed on the first display unit even when the predetermined time has elapsed from the start of the second input reception device.

14. The input reception system according to claim 10, wherein
the second control unit is configured to authenticate a person based on information input via the second input reception unit,
the first control unit sets:
the third predetermined temperature to a predetermined value after the second input reception device is started and before the person is authenticated; and
the third predetermined temperature to a value corresponding to the authenticated person after the second input reception device is started and the person is authenticated.

15. The input reception system according to claim 1, wherein the recommended operation information is a recommendation icon indicating a content of a recommended operation.

16. A control method of an input reception system including first and second input reception devices configured to receive an input of an operation instruction for operating an operation target of a vehicle, and a temperature detection unit configured to detect a temperature inside the vehicle, wherein the first input reception device includes a first display unit configured to display information, the control method comprising:
receiving the input of the operation instruction by being pressed or touched via the first input reception device; and
controlling the operation of the operation target based on the input of the operation instruction,
wherein a time required to start the second input reception device is longer than a time required to start the first input reception device, and
the control method further comprises:
causing the first display unit to display recommended operation information based on the temperature detected by the temperature detection unit; and
performing an operation corresponding to the recommended operation information in response to pressing or touching of the first display unit.

* * * * *